United States Patent
Cavallini et al.

(10) Patent No.: US 9,450,490 B2
(45) Date of Patent: Sep. 20, 2016

(54) AUTOMATIC REFERENCE GENERATOR IN SWITCHING BOOST CONVERTERS

(71) Applicant: Dialog Semiconductor (UK) Limited, Reading (GB)

(72) Inventors: Pier Cavallini, Swindon (GB); Louis DeMarco, Swindon (GB)

(73) Assignee: Dialog Semiconductor (UK) Limited, Reading (GB)

( * ) Notice: Subject to any disclaimer, the term of this patent is extended or adjusted under 35 U.S.C. 154(b) by 37 days.

(21) Appl. No.: 14/533,696

(22) Filed: Nov. 5, 2014

(65) Prior Publication Data

US 2016/0126838 A1   May 5, 2016

(51) Int. Cl.

| | |
|---|---|
| H05B 37/00 | (2006.01) |
| H05B 39/00 | (2006.01) |
| H05B 41/00 | (2006.01) |
| H02M 3/158 | (2006.01) |
| H05B 33/08 | (2006.01) |
| H05B 37/02 | (2006.01) |

(52) U.S. Cl.
CPC ......... *H02M 3/158* (2013.01); *H05B 33/0815* (2013.01); *H05B 37/02* (2013.01)

(58) Field of Classification Search
None
See application file for complete search history.

(56) References Cited

U.S. PATENT DOCUMENTS

| | | |
|---|---|---|
| 6,894,910 B1 | 5/2005 | Wu |
| 7,906,949 B1 | 3/2011 | Sutardja et al. |
| 2010/0013412 A1* | 1/2010 | Archibald .......... H05B 33/0827 315/294 |
| 2012/0081016 A1* | 4/2012 | Wu ..................... H05B 33/0827 315/192 |
| 2014/0103820 A1 | 4/2014 | Nerone |
| 2014/0333217 A1* | 11/2014 | Lee .................... H05B 33/0845 315/187 |

* cited by examiner

*Primary Examiner* — Anh Tran
(74) *Attorney, Agent, or Firm* — Saile Ackerman LLC; Stephen B. Ackerman (57) ABSTRACT

The present document relates to switching DC converters In particular, the present document relates to creating an auxiliary reference voltage for the switching converter to implement a dynamic correction of static load regulation. Main objective of the disclosure is minimizing the regulation error on account of accuracy when non-idealities present in the regulation loop are considered. An additional control loop to monitor the regulated error signal has been added. The additional loop has the purpose to create an auxiliary reference for the boost converter which will be updated (up and down) whenever the regulation exceeds a target threshold.

19 Claims, 8 Drawing Sheets

AUTOMATIC REFERENCE GENERATOR IN SWITCHING BOOST CONVERTERS

TECHNICAL FIELD

The present document relates to switching DC converters In particular, the present document relates to creating a reference voltage for the switching converter to implement a dynamic correction of static load regulation.

BACKGROUND

Common practice to set the output voltage of a switching converter is to close the control loop using an error amplifier which compares the target reference voltage and output voltage; whenever a delta between the two inputs of the error amplifier occurs, the error amplifier activates the feedback control forcing the output voltage high or low accordingly until the error is cancelled;

Disadvantages of this practice are factors that are not taken into account and cannot be compensated such the effects of the load regulation which occurs at large load currents and is caused by the parasitic resistance in the control loop (e.g. parasitic resistance of the coil, switch resistance of the solid state switches or rectifier diodes, resistance of the PCB tracks, etc.).

The effect on the load regulation can be partially compensated with trimming of the static reference (but resistance is supposed to change with temperature and aging of the components) or very high gain in the control loop which has the loss of the control stability as main drawback;

The problem becomes relevant when the regulation error has to be minimized on account to a good accuracy in switching converter regulators when the non-idealities present in the control loop are considered.

An example of a practical application problem is in a backlight system when the error in the regulated voltage could be an issue to optimize efficiency.

Figure 1A:
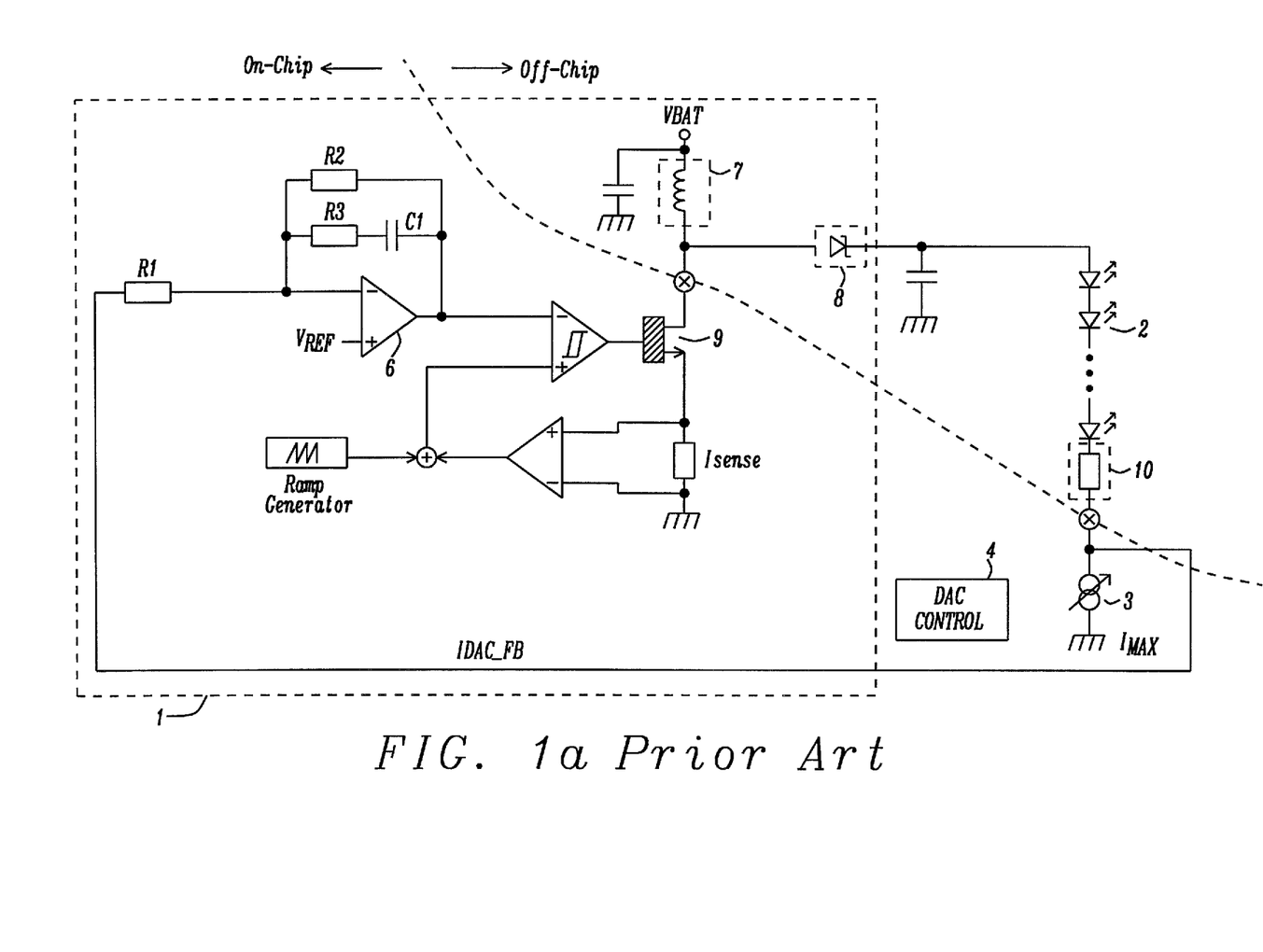

FIG. 1a prior art shows a typical implementation of a backlight system which comprises a boost converter 1, a set of strings of LEDs 2 each of which has a programmable current source (IDAC) 3 which are controlled by a DAC controlled block 4.

Feedback voltage 5 is taken at the bottom of the string of LEDs and sent to the error amplifier 6.

The dotted boxes 7-10 show where the major sources of parasitic resistance can be identified in the loop (parasitic resistance in the inductor 7, diode 8, switching device 9, and PCB line 10 connecting the LED strings 2.

In this specific example in order to operate at maximum efficiency, the voltage IDAC_FB at the top of the programmable current source 3 has to be regulated as close as possible to the minimum voltage that still guarantees saturation of the output stage (saturation voltage) of the IDAC current source.

If the regulation is too low, the current source goes into triode and does not deliver the programmed current, if too high the saturation is guaranteed but at the expenses of a lower efficiency.

Similar to the parasitic resistance, also the saturation voltage changes with temperatures as well as with the process variations of the silicon and the supply voltage, therefore in this example an optimal setting of the reference voltage at a specific load and temperature condition will not suit for all conditions;

It is a challenge for a designer of switching converters to overcome the problems caused by non-idealities of the circuit.

SUMMARY

A principal object of the present disclosure is to minimize the regulation error on account to a good accuracy in switching converter regulators when the non-idealities present in the control loop are considered.

Another principal object of the present disclosure is to operate at maximum efficiency, A further object of the disclosure is to optimize efficiency of the control loop of the switching converter, when the error in the regulated voltage could be an efficiency issue.

A further object of the disclosure is to achieve dynamic correction of static load regulation on the regulated output voltage.

A further object of the disclosure is to compensate temperature, voltage, process tolerance, and aging effects A further object of the disclosure is to avoid having to increase the voltage gain of the main control loop in order to overcome temperature, voltage, process tolerance, and aging effects A further object of the disclosure is to avoid the need of external components to overcome temperature, voltage, process tolerance, and aging effects A further object of the disclosure is to regulate the voltage at the top of the programmable current source as close as possible to the minimum voltage that still guarantees saturation of the output stage (saturation voltage) of the IDAC current source.

A further object of the disclosure is to maximize the low frequency gain (DC) at the open loop response of the converter.

In accordance with the objects of this disclosure a switching converter to minimize a regulation error has been disclosed the switching converter comprises: a port for a static reference voltage, a window comparator configured to comparing the static reference voltage with a scaled output voltage of the switching converter capable of setting control signals for an up and down counter with successive incremental corrections if a target range is exceeded, an auxiliary reference generator comprising the up and down counter, and a clock source to clock the up and down counter.

In accordance with the objects of this disclosure a system to minimize a regulation error comprising a boost converter and an auxiliary reference generator supplying a backlight system has been disclosed.

In accordance with the objects of this disclosure a method to minimize a regulation error of a switching converter on account to accuracy has been achieved. The method comprises the steps of: providing a switching converter comprising a static reference voltage source and a main regulation loop configured to regulate an output voltage of the switching converter, comparing the static reference voltage and an accordingly scaled output voltage of the switching converter by a hysteretic controlling means which is independent of the main regulation loop, setting an output of the control as part of an auxiliary reference generator to a regulated charge pump if the comparison of the static reference with the output voltage of the switching converter is beyond a target range, and updating an output of the charge pump by pumping up or respectively low the output voltage of the switching converter if the comparison of the static reference with the output voltage of the switching converter is beyond a target range.

BRIEF DESCRIPTION OF THE FIGURES

The invention is explained below in an exemplary manner with reference to the accompanying drawings, wherein FIG. 1a prior art shows a typical implementation of a backlight system.

DETAILED DESCRIPTION

Methods and circuits for integrated solutions of switching converters which allow automatically adjusting the reference voltage of the error amplifier and compensating for the non-idealities of the circuit (temperature, aging effects and silicon variations) are disclosed. The methods and circuits disclosed don't require any trimming or correction in the main control loop of the converter.

Main point of the disclosure is to add an additional control loop to monitor the regulated error signal. The system must be independent of the load regulation and should not interfere with the main regulation loop of the switching converter.

The additional control loop has the purpose to create an auxiliary reference for the boost converter which will be updated (up and down) whenever the regulation exceeds a target range. As the accuracy and efficiency have to be considered as DC parameters, the time constant that controls the auxiliary loop can be extremely large.

It should be noted that the methods and circuits disclosed are applicable to any switching regulator independently of the control scheme (voltage or current mode) and type of compensation network (TYPE I, II and III or hysteretic).

An important item of the disclosure is that instead of using only a static fix reference voltage for the error amplifier, an additional stage is implemented based on a regulated charge pump with hysteretic control that compares the static reference voltage with the output voltage (scaled accordingly) and sets its output when the error is above an upper threshold or below a lower threshold, i.e. if a defined target range is exceeded. The output is then used as the real reference voltage for the error amplifier of the switching converter.

In a preferred embodiment of the disclosure a window of +−20 mV has been selected. It should be noted that the values of the upper and lower offset voltages may be different as e.g. +20 mV and −15 mV. The values of the offset voltages are selected in order to provide sufficient hysteresis and to cover statistical offset of transistors used.

Using any slow clock (i.e. on board 32.763 KHZ oscillator or a portion of the frequency) to control the charge pump, the automatic adjustment of the reference voltage works as slow feedback control loop where the reference voltage of the error amplifier is updated every 30.52 μsec or multiples of it. At each cycle, if the feedback of the switching converter, e.g. a boost converter) is below or above the target voltage of the static reference voltage, the charge pump updates its output by pumping up or low the reference voltage.

The extreme relaxed time of the clock, is an additional advantage for any low power applications since the charge pump used to generate the auxiliary reference is very efficient in this case.

The automatic reference generator requires operating:

A static reference voltage wherein no trimming and error correction is required;

A broad range of alternative implementations of a static reference voltage is possible. The static reference voltage may be a resistor divider, a voltage from a bandgap reference or an active device (i.e. current in a diode); the latter is used for example in the system disclosed below;

A window comparator with a hysteretic window to set the control signals for an up and down counter with successive incremental corrections.

A broad range of alternative implementations of a suitable comparator is possible. The one considered for example for the system disclosed below consists of a set of 2 equal comparators, one comparator monitoring if the feedback is above and the other comparator if the feedback is below the target value by a certain offset defined by the hysteresis (e.g. +/−20 mV); In detail the offset within each comparator can be simply created by sizing differently the input differential pair of a comparator;

It should be noted that providing a hysteresis for the up and down increments improves the operational behavior of the system disclosed.

An auxiliary reference voltage generator with an up/down counter for successive incremental corrections. A broad range of alternative implementations of a suitable auxiliary reference generator with different degrees of accuracy and complexity is possible.

Figure 1B:
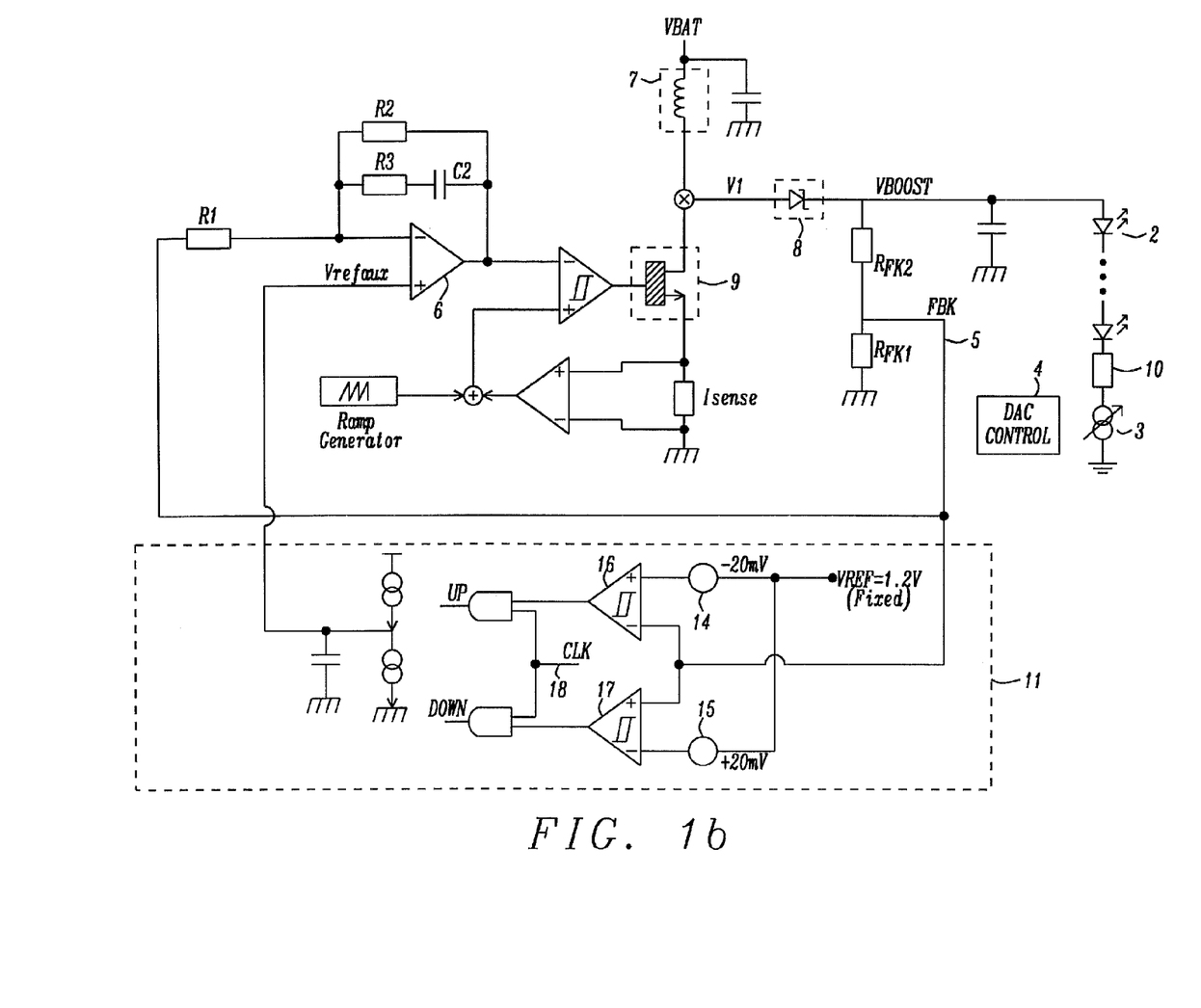
FIG. 1b shows the method disclosed applied to a boost converter using feedback from a resistive voltage divider, a fixed reference voltage of e.g. 1.2V, and an auxiliary dynamic reference circuitry.

Few examples of such a reference generator are:

Resistor divider with multiple tap points (voltage DAC);

A programmable current into a fix resistor (current DAC);

The solution proposed in this disclosure, which prevails for simplicity and low power characteristics, and therefore is a charge pump with a holding capacitor (i.e. 50 pF). It can be simply a set of low current sources (high side and low side) charging (high side) or discharging (low side) the holding capacitor depending on the control signals defined by the window comparator. Such a charge pump 12 is shown in FIG. 1b;

Once the increment/decrement has taken place, the voltage is maintained by the holding capacitor and no power is required until the next incremental/ decreasing step;

A clock source to clock the up and down counter;

Since the update of the auxiliary source is not constantly required, a low clock frequency clk with short pulse duration is recommended for low power applications.

In this application it is derived from an internal 32 KHz oscillator or a portion of this frequency. The length of pulses is limited to 1 μs to avoid the use of a large holding capacitors or too small charging currents;

The size of the holding capacitor is a compromise between the length of the clk period and the duration of the pulse; e.g. each clk pulse gives a +/−10 mV voltage increase/decrease of the output of the pump, the discharging current (leakage) must observe the equation:

$$\frac{dV}{dT} * C = dI \rightarrow \frac{10 \text{ mV}}{1 \text{ μs}} * 50 \text{ pF} = 500 \text{ nA}$$

FIG. 1b shows the method disclosed applied to a backlight system comprising a boost converter 1 using feedback from a resistive voltage divider $R_{FK1}$, $R_{FK2}$, a fixed reference voltage Vref of e.g. 1.2V, and an auxiliary dynamic reference circuitry 11.

The boost converter 1 generates the output voltage $V_{BOOST}$ and comprises the voltage divider $R_{FK1}$, $R_{FK2}$ generating a feedback voltage FBK 5, an error amplifier 6, comparing the feedback voltage FBK 5 with the output Refax of the auxiliary dynamic reference circuitry 11, an inductor 7, a diode 8, and a switching device 9.

Furthermore the backlight system comprises one or more sets of strings of LEDs 2 each of which has a programmable current source (IDAC) 3 which are controlled by a DAC control block 4. The auxiliary dynamic reference circuitry 11 comprises a port 13 for a fixed reference voltage Vref of e.g. 1.2V. A hysteretic operation of the comparators 16 and 17 is achieved by adding voltage source 14, providing e.g. −20 mV and voltage source 15, providing e.g. +20 mV to the inputs of comparator 16 respective comparator 17. Clock pulses clk are generated by a clock 18 generating e.g. 32 kHz pulses.

The boost controller of FIG. 1b generates an output voltage:

$$V_{Boost} = (R_{FK1} + R_{FK2})/R_{FK1}.$$

Figure 2:
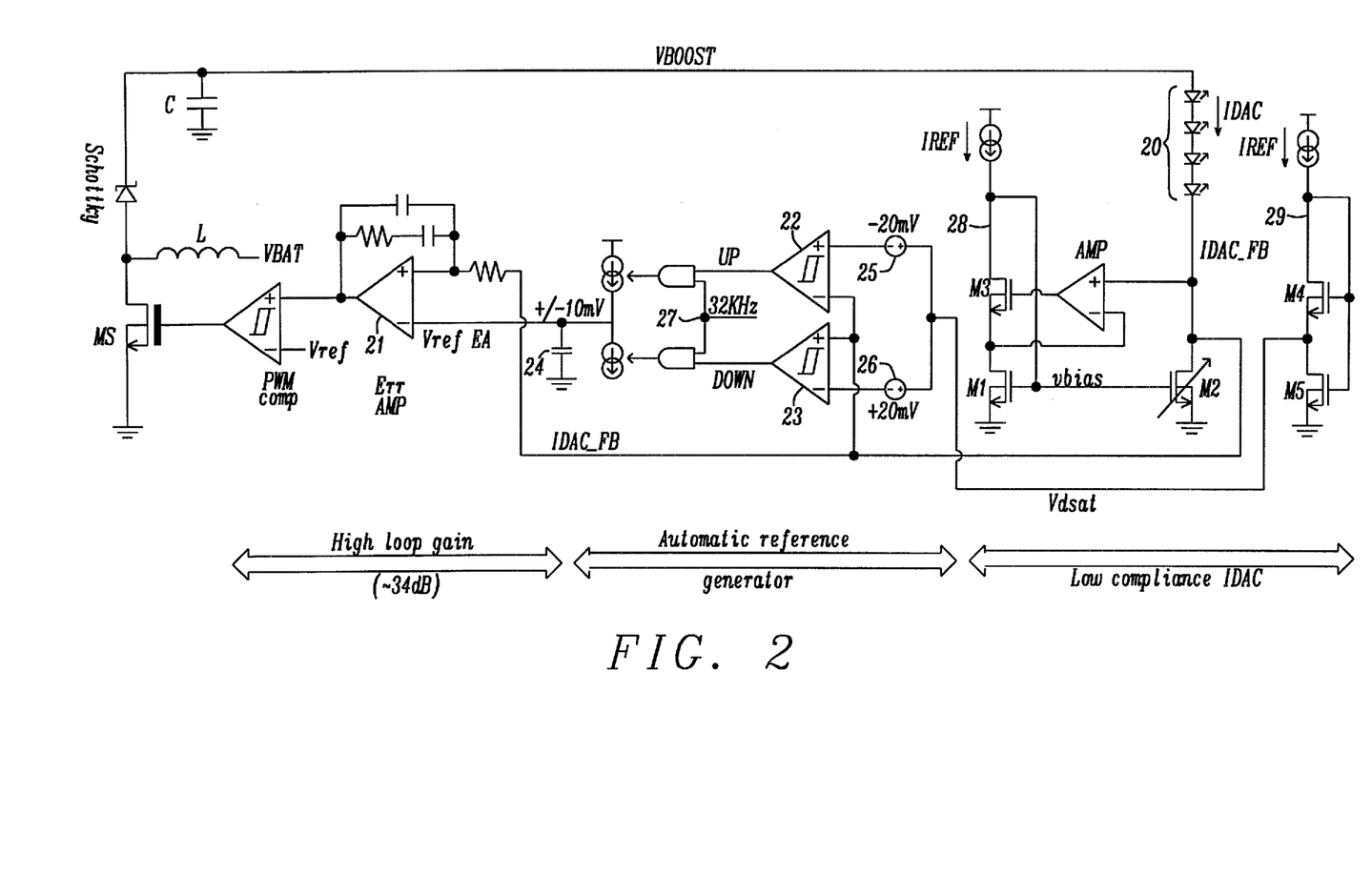
FIG. 2 shows a model of the automatic reference generator disclosed applied for example within a control loop of a backlight system using a boost converter.

FIG. 2 shows a model of the automatic reference generator disclosed applied for example within the control loop of a backlight system using a boost converter:

The backlight system works as it follows:
The boost converter provides a voltage VBOOST boosted from the battery supply VBAT on top of the string of e.g. 4 LEDs diodes. More than one string of LED diodes could also be supplied by the boost converter. A programmable constant current IDAC is provided at the bottom of each string IDAC_FB by M1/M2 current mirror (as shown in FIG. 2). The accuracy of the current IDAC is achieved through a regulation provided by the boost control loop itself:
In order to have current iDAC=IREF×M (M is the target multiplication factor which is programmed), the feedback voltage IDAC_FB must be equal to the voltage at the drain of transistor M1. The voltage at the drain of M1 becomes the reference for the boost converter.
The two IREF strings 28 and 29 are connected to supply, e.g. 1.5V but it should be noted that, since the both strings comprise ideal current sources, it doesn't really matter where the pin is connected.

Transistors M4/M5 are a replica of the M3/M1 and generate a fix target reference voltage Vdsat at which the drain on M2 must be regulated.
If the drain of transistor M5 would be connected to the input of the error amplifier, then the regulation will suffer of the effects of the parasitic elements in the loop which can be only partially cancelled by the large loop gain (e.g. 34 dB in this application).

The auxiliary reference generator monitors voltage Vdsat and compares it with the regulated voltage IDAC_FB. If voltage IDAC_FB is too low compared to Vdsat the signal UP is generated by hysteretic comparator 22 and allows the charge pump to pulse current into the capacitor C 24 (each pulse is e.g. about 10 mV). If voltage IDAC_FB is high compared to voltage Vdsat the signal DOWN is generated by hysteretic comparator 23 and allows pulsing current out of the capacitor C 24 (each pulse is e.g. about 10 mV). When the target is reached, both UP and DOWN are low and the holding capacitor C 24 holds the value. A hysteretic operation of the comparators 22 and 23 is achieved by adding voltage source 25, providing e.g. −20 mV and voltage source 26, providing e.g. +20 mV to the inputs of comparator 22 respective comparator 23. Clock pulses are generated by a clock 27 generating e.g. 32 kHz pulses of a voltage of +/−10 mV across a smoothing capacitor 24.

It is obvious that the circuit of FIG. 2 can operate with more than one LED strings. Only one string has been shown in FIG. 2 to avoid unnecessary complexity.

Figure 3:
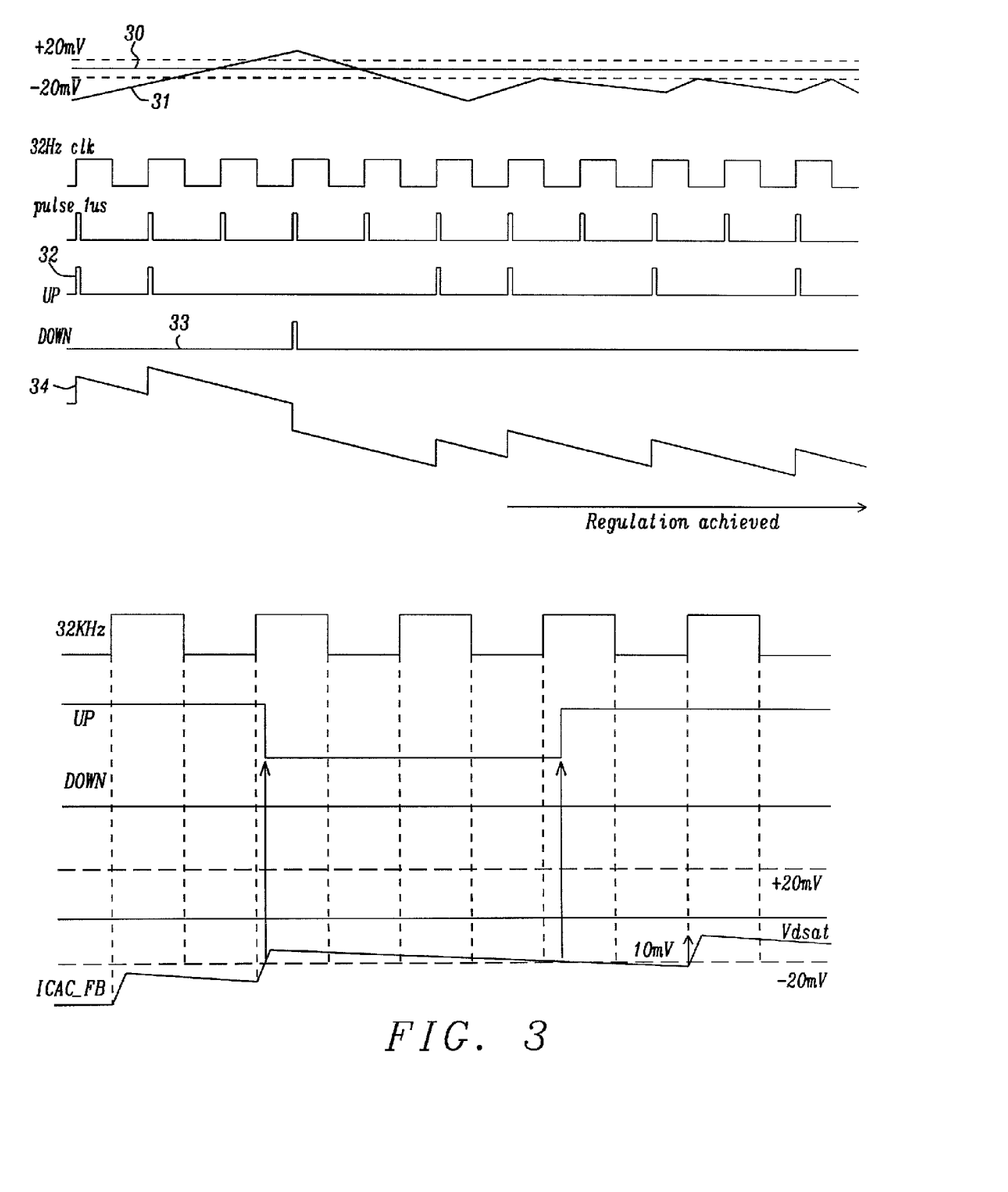
FIG. 3 shows two plots of the regulated signals and internal nodes of the automatic reference generator disclosed.

FIG. 3 shows two plots of closed loop waveforms using the automatic reference generator disclosed. The upper and lower blocks of plots of FIG. 3 were generated using a virtual model of the circuit disclosed in operation. Curve 30 shows a time chart of Vdsat, which is expected to be around 130 mV nominal, curve 31 shows a time chart of IDAC_FB, curve 32 shows a time chart of pulses UP, curve 33 shows a time chart of pulses DOWN, and curve 34 shows a time chart of vref_EA. The voltage vref_EA is the reference of the error amplifier 21 and includes the compensation of the regulation load effects. Curve 32 and 33 are both clocked e.g. at 32 kHz, i.e. an example of a slow clock.

The lower block of plots highlight the fact that the pulse to clock clk up/down is always released a clock pulse after the boundaries of the hysteretic window are crossed.

Figure 4:
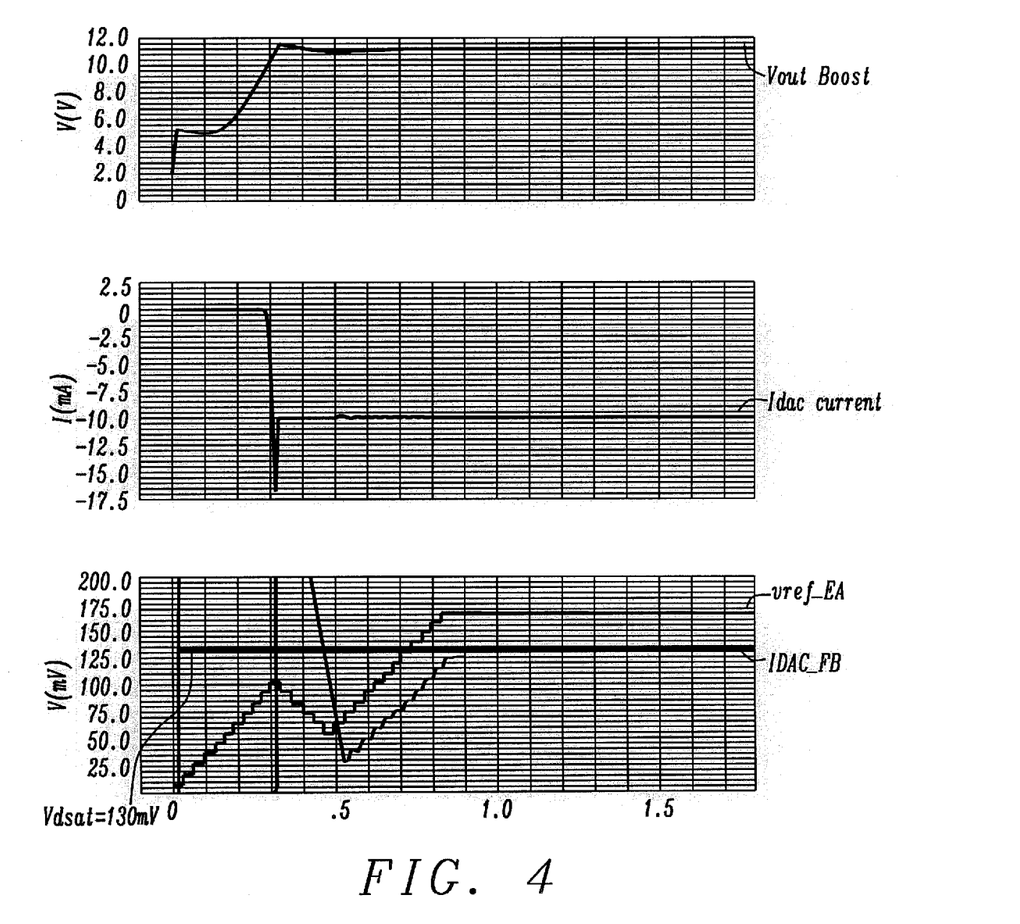
FIG. 4 shows the simulation results of the backlight system using the auxiliary dynamic reference generator disclosed at room temperature.

FIG. 4 shows the simulation results of the backlight system using the auxiliary dynamic reference generator disclosed at room temperature.

The current of the IDAC is set to 10 mA; the dynamic reference starts from zero and ramps up until gets into tracking mode (vref_EA). The programmable the +/−20 mv hysteresis have been disabled. A disabled hysteresis means no error but requires increased switching activities in a real system. The reference indicating the saturation voltage is e.g. VDSAT.193, 7 mV.

The regulated voltage IDAC_FB ends up being less than 8 mV from the reference.

As expected in order to compensate for the load regulation the vref_EA must be higher that the target VDSAT.

Figure 5:
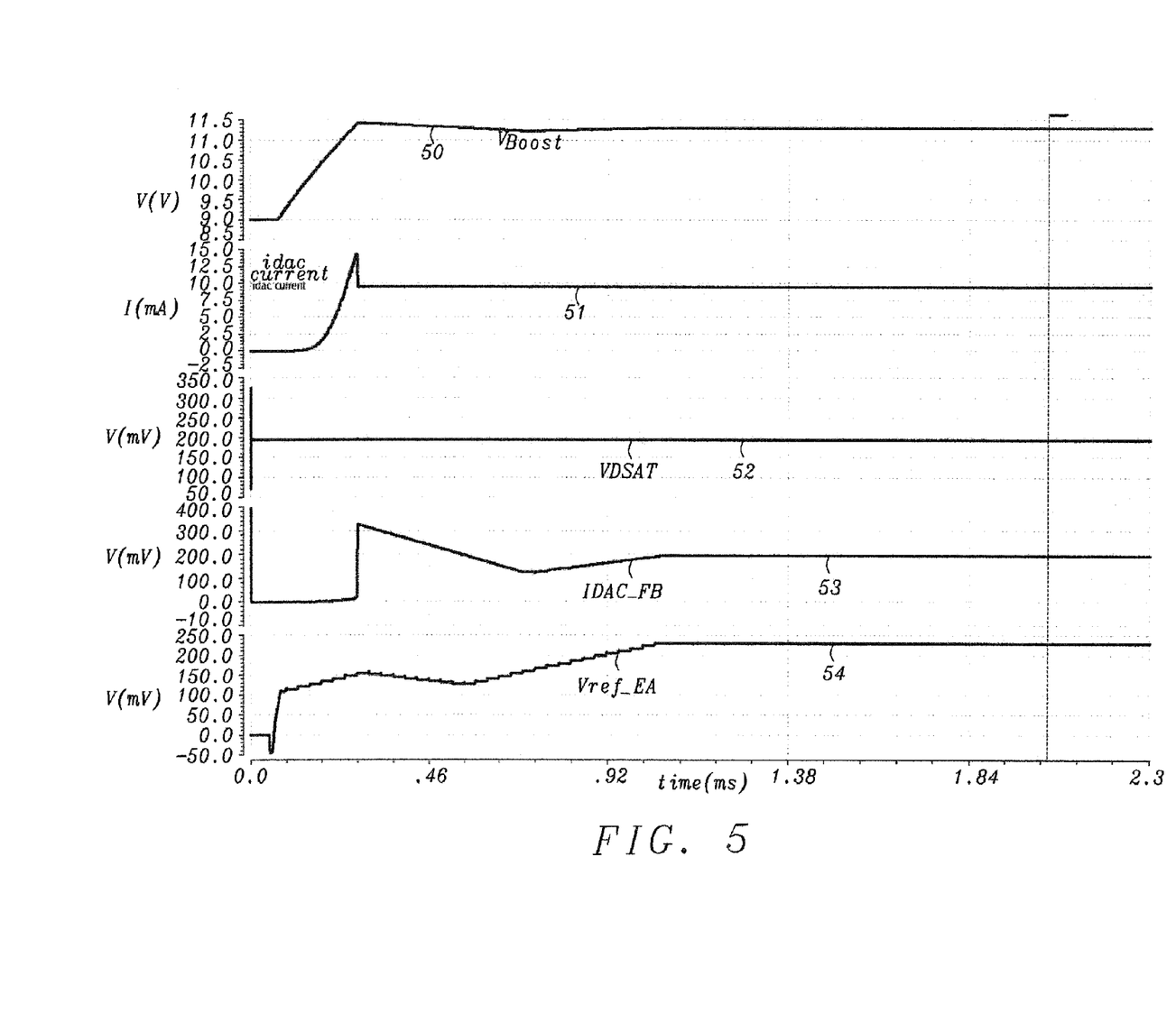
FIG. 5 shows the start-up time charts of important parameters at nominal temperature (+27 degree Celsius) and nominal process corners.

FIG. 5 shows the start-up time charts of important parameters at nominal temperature (+27 degree Celsius) and nominal process corners. Curve 50 shows the start-up of VBOOST, Curve 51 shows the start-up of IDAC current, Curve 52 shows the start-up of voltage VDSAT, Curve 53 shows the start-up of the voltage IDAC_FB, and Curve 54 shows the start-up of $V_{ref\_EA}$.

As it can be seen in the sub-window on FIG. 5, the reference voltage vref_EA increases with temperature as expected but the final regulated voltage tracks closely the reference.

Figure 6:
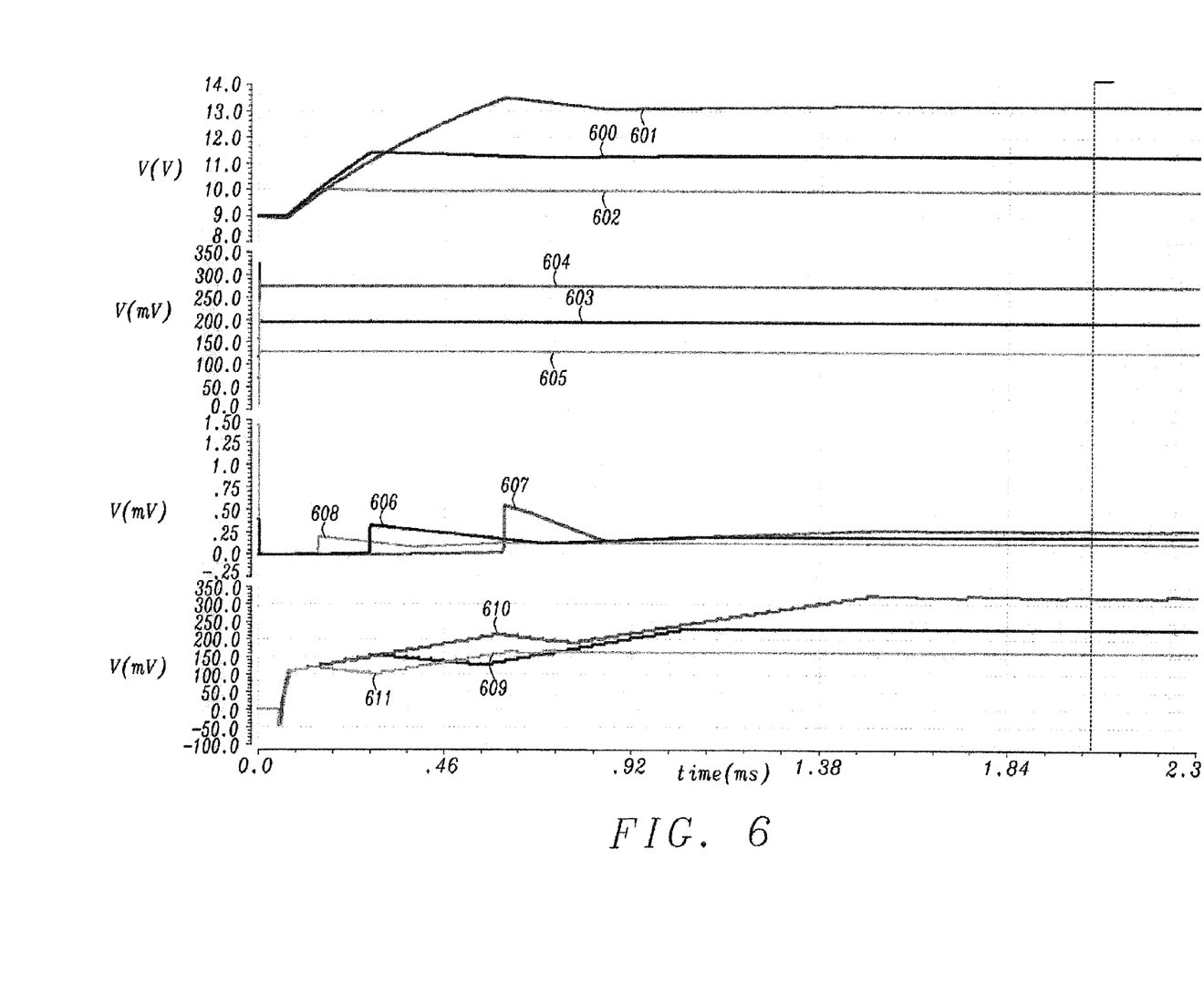
FIG. 6 shows schematic simulations of the automatic reference adjustment circuit disclosed vs. temperature and process corners.

FIG. 6 shows schematic simulations of the automatic reference adjustment circuit disclosed vs. temperature and process corners. It shows a parametric simulation for three different junction temperatures (−40, 27 and 125° C.) and process corners (typical, slow, and fast). A fast process corner means lower threshold voltage Vth of the device, hence voltage VDSAT is higher, high temperatures are also increasing voltage VDSAT. Hence fast process corner plus high temperature yield a maximum VDSAT, while a low process corner and low temperatures yeild a minimum VDSAT.

Curve 600 shows the start-up of voltage VBOOST at nominal temperatures and process corner. Curve 601 shows voltage VBOOST at fast process corner and 125 degrees Celsius. Curve 602 shows voltage VBOOST at slow process corner and −40 degrees Celsius.

Curve 603 shows the start-up of voltage VDSAT at nominal temperatures and process corner. Curve 604 shows the highest voltage VDSAT at fast process corner and 125 degrees Celsius. Curve 605 shows the lowest voltage VDSAT at slow process corner and −40 degrees Celsius.

Curve 606 shows the start-up of voltage IDAC_FB at nominal temperatures and process corner. Curve 607 shows voltage IDAC_FB at fast process corner and 125 degrees Celsius. Curve 608 shows IDAC_FB at slow process corner and −40 degrees Celsius.

Curve 609 shows the start-up of voltage VREF_EA at nominal temperatures and process corner. Curve 610 shows voltage VREF_EA at fast process corner and 125 degrees Celsius. Curve 611 shows voltage VREF_EA at slow process corner and −40 degrees Celsius.

The table below outlines the most important results of the simulation:

| Temp. [° C.] | Vdsat [mV] | vref_EA [mV] | Delta Vdsat - IDAC_FB [mV] |
|---|---|---|---|
| −40 | 128.8 | 167.3 | |
| 27 | 193.7 | 128.6 | <2 |
| 125 | 273.26 | 321.1 | |

Figure 7:
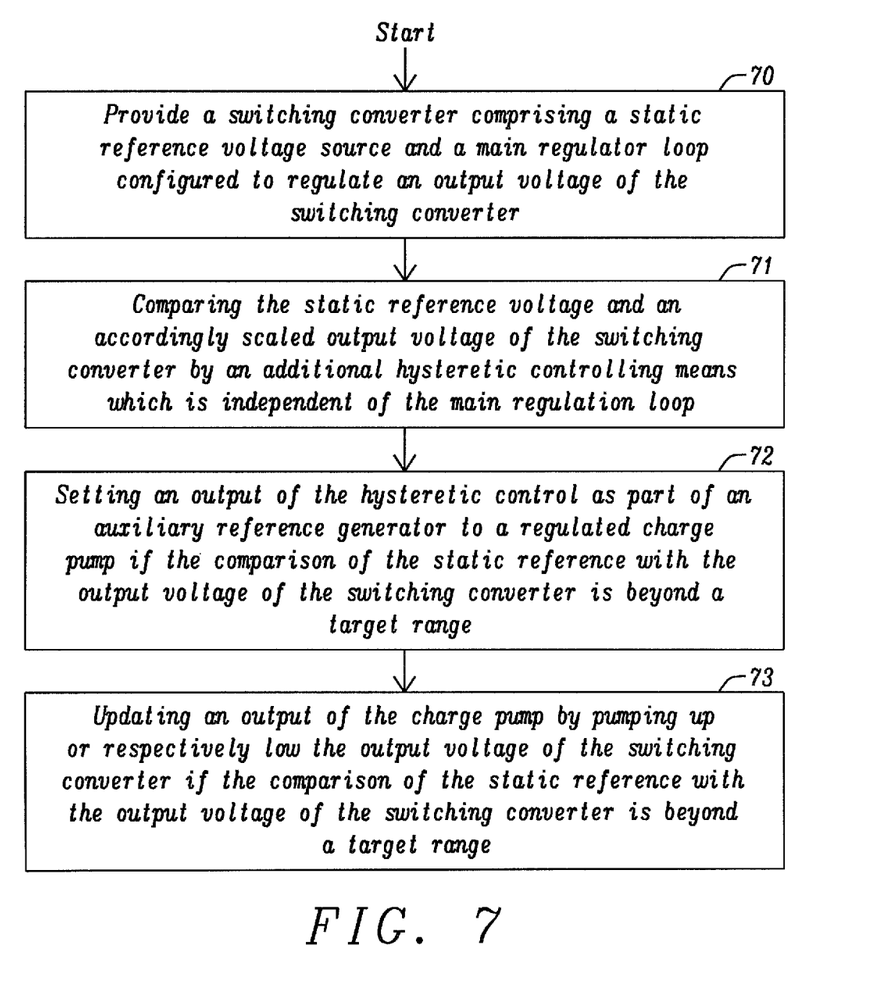
FIG. 7 shows a flowchart of a method to minimize a regulation error of a switching converter on account to accuracy.

FIG. 7 shows a flowchart of a method to minimize a regulation error of a switching converter on account to accuracy. A first step 70 depicts provision of a switching converter comprising a static reference voltage source and a main regulation loop configured to regulate an output voltage of the switching converter. The next step 71 shows comparing the static reference voltage and an accordingly scaled output voltage of the switching converter by an additional hysteretic controlling means which is independent of the main regulation loop. Step 72 describes setting an output of the hysteretic control as part of an auxiliary reference generator to a regulated charge pump if the comparison of the static reference with the output voltage of the switching converter is beyond a target range. The following step 73 illustrates updating an output of the charge pump by pumping up or respectively low the output voltage of the switching converter if the comparison of the static reference with the output voltage of the switching converter is beyond a target range.

What is claimed is:

1. A switching converter to minimize a regulation error comprising:
   a port for a static reference voltage;
   a window comparator configured to comparing the static reference voltage with a scaled output voltage of the switching converter capable of setting control signals for an up and down counter with successive incremental corrections if a target range is exceeded;
   an auxiliary reference generator comprising the up and down counter, wherein an output of the auxiliary reference generator equals the static reference voltage if the scaled output voltage of the switching converter does not exceed the target range and the output of the auxiliary reference generator performs the successive incremental corrections of the static reference voltage if the scaled output voltage of the switching converter exceeds the target range;
   an error amplifier, configured to compare the scaled output voltage of the switching converter with the output of the auxiliary reference generator; and
   a clock source to clock the up and down counter.

2. The switching converter of claim 1 wherein the converter is a boost converter.

3. The switching converter of claim 1 wherein the window comparator has a hysteretic window.

4. The switching converter of claim 3 wherein the window comparator comprises a set of two equal comparators, wherein a first comparator is configured to monitoring if a result of the comparison of the static reference voltage with the output voltage of the switching converter is above a target voltage by a first offset voltage and a second comparator is configured to monitoring if a result of the comparison of the static reference voltage with the output voltage of the switching converter is below the target voltage by a second first offset voltage.

5. The switching converter of claim 4 wherein said first and second offset voltages have a same value or different values.

6. The switching converter of claim 1, wherein the auxiliary reference generator comprises a charge pump with a holding capacitor configured to holding the output voltage of the auxiliary reference generator, wherein the charge pump is configured to charging or discharging the holding capacitor depending on signals generated by the window comparator according to comparison results.

7. The switching converter of claim 6 wherein the holding capacitor is configured to holding the output voltage until a next incremental or decreasing step occurs and no power is required between the steps.

8. A system comprising a boost converter to minimize a regulation error comprising an auxiliary reference generator supplying a backlight system, the system comprising:
   a means for generating a static reference voltage Vdsat;
   a window comparator configured to comparing the static reference voltage Vdsat with a feedback voltage IDAC_FB of the boost converter, wherein the feedback voltage IDAC$_{13}$ FB indicates the strength of a current IDAC through a string of the backlight system and is capable of setting control signals for an up and down counter with successive incremental corrections if a target range is exceeded;
   an auxiliary reference generator comprising the up and down counter;
   a clock source to clock the up and down counter,
   one or more light emitting diode (LED) strings, wherein each string comprises one or more LEDs, wherein an output voltage of the boost converter is connected to a first terminal of each LED string, a second terminal of each LED string is connected to ground, and a part of current mirror arrangements, deployed in each LED string, is capable of generating a programmable constant current IDAC, flowing through each LED string; and a first reference current string comprises a constant current source providing a reference current IREF which is mirrored to each to each LED string.

9. The system of claim 8 wherein the first reference current string further comprises, a first transistor and a third transistor, wherein the first transistor is configured to mirroring the reference current IREF to a second transistor, which deployed in each of the one or more LED string, wherein the current IDAC =IREF ×M, wherein M is a target multiplication factor which is programmed and wherein a voltage at a drain of the first transistor is configured to be equal to the feedback voltage IDAC-FB.

10. The system of claim 8, wherein the auxiliary reference generator comprises a charge pump with a holding capacitor configured to holding the output voltage of the auxiliary reference generator, wherein the charge pump is configured to charging or discharging the holding capacitor depending on signals generated by the window comparator according to comparison results.

11. The system of claim 8 wherein the window comparator has a hysteretic window.

12. The system of claim 11 wherein the window comparator comprises a set of two equal comparators wherein a first comparator is configured to monitoring if a result of the comparison of the static reference voltage with the output voltage of the boost converter is above a target voltage by a first offset voltage and a second comparator is configured to monitoring if a result of the comparison of the static reference voltage with the output voltage of the boost converter is below the target voltage by a second first offset voltage.

13. A method to minimize a regulation error of a switching converter on account to accuracy, the method comprising the steps of:

(1) providing a switching converter comprising a static reference voltage source, an auxiliary reference generator comprising an up and down counter, an error amplifier and a main regulation loop configured to regulate an output voltage of the switching converter;

(2) comparing the static reference voltage with an accordingly scaled output voltage of the switching converter by a hysteretic window comparator;

(3) performing successive incremental corrections of the static reference voltage by the auxiliary reference generator if the comparison of the scaled output voltage of the switching converter with the static reference voltage results in exceeding a target range;

(4) comparing an output of the auxiliary reference generator with the scaled output voltage of the switching converter by the error amplifier and regulate the output voltage of the switching converter in order to stay within the target range.

14. The method of claim 13 wherein the switching converter is a boost converter.

15. The method of claim 13 wherein the hysteretic window comparator comprises a set of two equal comparators, wherein a first comparator is configured to monitoring if a result of the comparison of the static reference voltage with the output voltage of the switching converter is above a target voltage by a first offset voltage and a second comparator is configured to monitoring if a result of the comparison of the static reference voltage with the output voltage of the switching converter is below the target voltage by a second first offset voltage.

16. The method of claim 15 wherein said first and second offset voltages have a same value.

17. The method of claim 13, wherein the auxiliary reference generator comprises a charge pump with a holding capacitor configured to holding the output voltage of the auxiliary reference generator, wherein the charge pump is configured to charging or discharging the holding capacitor depending on signals generated by the window comparator according to comparison results.

18. The method of claim 17 wherein the holding capacitor is configured to holding the output voltage until a next incremental or decreasing step occurs and no power is required between the steps.

19. The method of claim 13 wherein the switching converter is a boost converter supplying a backlight system.

* * * * *